March 16, 1965 W. M. ROBINSON 3,173,960
PURIFICATION OF HIGH MELTING DIMETHYL NAPHTHALENES
Filed Nov. 29, 1962
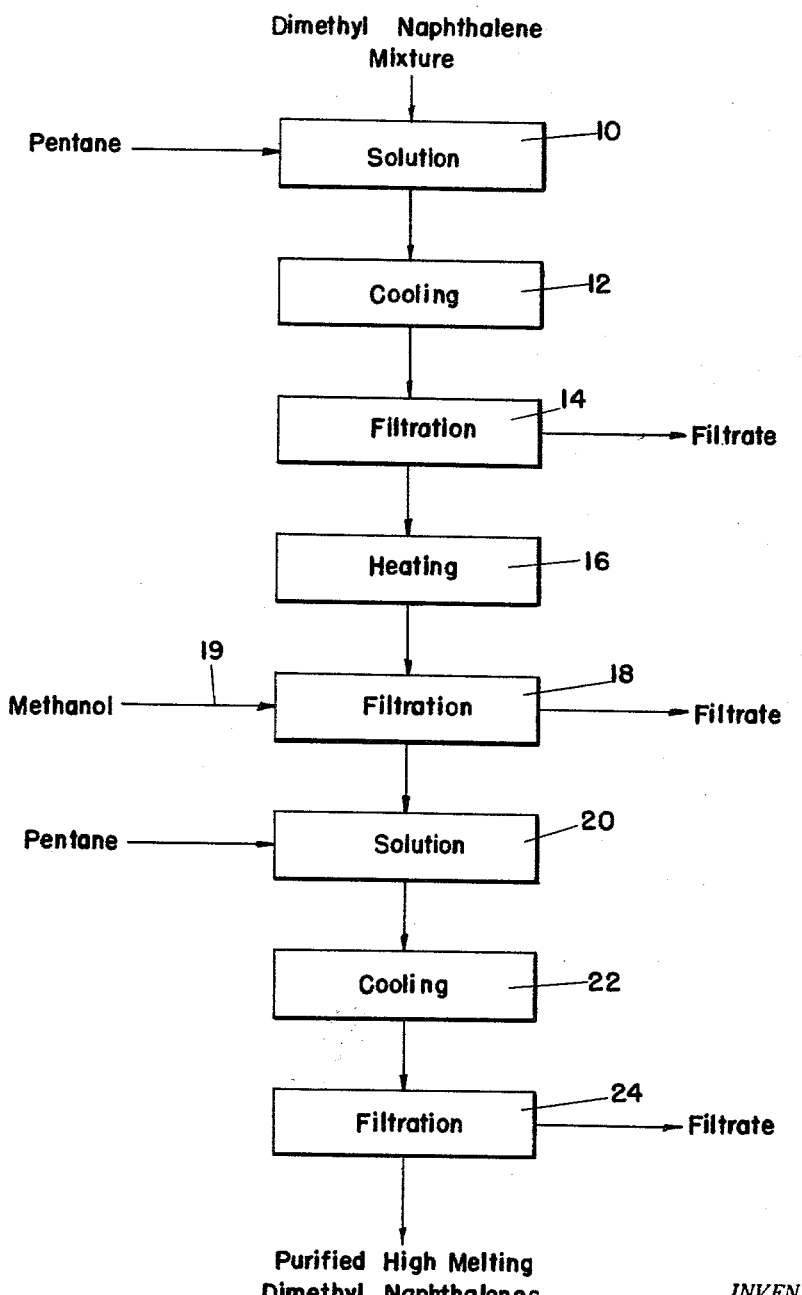
INVENTOR.
WILLIAM M. ROBINSON
BY
Robert O. Spindle
ATTORNEY Patented Mar. 16, 1965

3,173,960
PURIFICATION OF HIGH MELTING DIMETHYL
NAPHTHALENES
William M. Robinson, Holmes, Pa., assignor to Sun Oil
Company, Philadelphia, Pa., a corporation of New
Jersey
Filed Nov. 29, 1962, Ser. No. 239,874
7 Claims. (Cl. 260—674)

In various products obtained in petroleum refining, the aromatic hydrocarbon, 2,6-dimethyl naphthalene, and other high melting dimethyl naphthalenes, e.g. 2,3- and 2,7-dimethyl naphthalene, are contained in substantial amounts. Thus, for example, a light catalytic gas oil fraction may typically contain in the neighborhood of 1.5 weight percent of 2,6-dimethyl naphthalene. By solvent extraction of aromatic hydrocarbons from the gas oil, and by distillation of the solvent-free extract, the dimethyl naphthalenes can be concentrated to some extent. Further concentration of the high melting dimethyl naphthalenes can be accomplished by fractional crystallization. However, by conventional procedures, it is difficult or impossible to obtain a product that has a melting point within 10° C. of the melting point of the highest melting isomer, which is the 2,6-isomer, having melting point of about 110.5° C.

According to the present invention, however, a novel separation process is provided which is capable of producing a product with a melting point well within the range from 100 to 110.5° C., indicating a higher degree of concentration than that previously obtainable, starting with petroleum or other aromatic hydrocarbon fractions. Since, in various applications of high melting dimethyl naphthalenes, relatively high purity is desired, and may be required for commercial suitability, the present invention constitutes an important step in the commercial use of such dimethyl naphthalenes.

The subsequent description refers to the preparation of a 2,6-dimethyl naphthalene concentrate, and such concentrate will be understood as being also a concentrate of other high melting isomers. The extent of concentration of the 2,6-isomer is however greater than that of the other high melting isomers, and the process is therefore a process for concentrating the 2,6-isomer with respect to all other isomers.

The process of the invention involves, first, the fractional crystallization of a preliminary 2,6-dimethyl naphthalene concentrate from a solution of a petroleum fraction, which fraction contains a substantial amount, usually in the range from 1 to 20 weight percent, of the 2,6-dimethyl naphthalene.

The temperatures involved in the crystallization may vary. Typically, the solution is formed at room temperature, though higher temperatures can be employed if desired in order to reduce the amount of solvent needed. The solvent ratio is not critical, but will usually be in the range from 0.5 to 2.5 parts by volume of solvent per part of hydrocarbon charge. Suitable solvents are disclosed subsequently.

Typically, the crystallization is performed by cooling the solution to a temperature in the approximate range from minus 30° C. to minus 60° C., though higher temperatures can be used, e.g. up to 0° C. The best temperature depends on the solvent. With some solvents, such as methanol, it is necessary to use relatively high temperatures, e.g. minus 30° C. or above, in order to avoid excessive precipitation of lower melting isomers.

The precipitated concentrate of 2,6-dimethyl naphthalene is filtered or othewise separated from the solution containing dissolved constituents of the original hydrocarbon fraction. Desirably, the filter cake is washed with cooled solvent to remove adhering mother liquor, though this is not necessary.

The filter cake is next heated in order to melt a portion thereof. The heating is to a temperature in the range from 5° C. to 50° C., more preferably in the range from 20 to 30° C. The melted hydrocarbons are then removed from the unmelted portion of the filter cake, which portion constitutes a 2,6-dimethyl naphthalene concentrate. Typically this concentrate has melting point in the range from 50 to 75° C., representing some concentration of the desired aromatics from the starting material. However, it is still quite impure, as may be seen from comparison with the melting point of 2,6-dimethyl naphthalene.

Advantageously, the heating step and the subsequent removal of melted material from the remaining solids are performed on the same filter, or in the same centrifuge, etc. that is used to separate crystals from mother liquor after the first crystallization. However, if desired, these steps can be performed in separate heating and separation zones.

The melted material can be removed from the crystals by suction through a filter, or by washing with a solvent, or both. Lower alcohols are preferred solvents. Aliphatic hydrocarbons can be employed, but relatively low temperatures should be used if aliphatic hydrocarbons are employed in the washing, since otherwise excessive amounts of 2,6-dimethyl naphthalene may be removed from the crystals. Mixtures of aliphatic hydrocarbons and lower alcohols may be employed. It is within the scope of the invention to omit the washing step, though superior results are obtained if it is included. Where the washing with solvent is performed, it may be done simultaneously with the heating step.

The amount of crystals which is melted is preferably in the range from 5 to 50 weight percent of the total crystals. Lesser amounts usually do not provide optimum purification of the 2,6-dimethyl naphthalene, while greater amounts usually result in an undesirable extent of melting of 2,6-dimethyl naphthalene. However, in general, any substantial extent of fractional melting will result in a desirable purification of the unmelted 2,6-dimethyl naphthalene.

In one embodiment, the 2,6-dimethyl naphthalene concentrate obtained by removing melted material from the heating step is next recrystallized. The solution is preferably formed at room temperature, though higher temperatures can be used if desired. The crystallization is performed by cooling to a suitable temperature, e.g. in the range from minus 30° C. to minus 60° C., though other temperatures, as indicated for the first crystallization, may be used if desired. Solvent ratios are not critical, but are usually in the range indicated for the earlier crystallization.

The precipitated 2,6-dimethyl naphthalene concentrate is then removed from the mother liquor, e.g. by filtration. The filter cake can be washed using cooled solvent, but this is not essential.

Following the filtration at reduced temperature, the filtered crystals are usually permitted to warm to room temperature. There may be a small amount of material in the crystals which melts during this warming, and this material may be removed by suction through the filter, aided by washing with cooled methanol if desired, but such removal is not essential.

Solvents in which petroleum gas oil aromatics in the boiling range of 495 to 510° F. are soluble to a suitable extent, for example at least one gram per 10 ml. of solvent at 25° C., and which remain liquid at the crystallization temperatures are generally suitable for use in the crystallizations involved in the process according to the invention. Preferred solvents are aliphatic hydrocarbons and mixtures thereof with aliphatic alcohols. Suitable aliphatic hydrocarbons include propane, isobutane, n-pentane, n-hexane, heptanes, etc. Suitable alcohols include methanol, ethanol, isopropanol, n-butanol, amyl alcohols, etc. The amount of alcohol in the solvent is preferably in the range from 0 to 75 volume percent, more preferably not more than 60 volume percent. The aliphatic hydrocarbon preferably has 3 to 6 carbon atoms, the alcohol 1 to 4 carbon atoms. Ketones, e.g. acetone, methyl isobutyl ketone, etc., can be substituted for, or used in conjunction with, alcohols. In the light of the present specification, a person skilled in the art can select other solvents meeting the criteria stated above. The solvents used can be the same in the earlier and later crystallizations; alternatively, different solvents can be employed in the respective crystallizations. Solvents used for washing filter cakes can be the same as, or different from, the solvents used in the crystallization; preferably they are the same.

Preferred charge stocks according to the invention are aromatic concentrates from catalytically or thermally cracked materials in the gas oil boiling range. Aromatic concentrates from the hydrocarbons of appropriate boiling point produced in the thermal cracking of catalytic reformate also constitute a preferred charge stock. Aromatic concentrates can be obtained for example by known procedures such as solvent extraction with furfural or other selective solvent, or selective adsorption on silica gel, etc. Although the above are preferred, other charge stocks which have substantial quantities of dimethyl naphthalenes can be used.

The hydrocarbons from which 2,6-dimethyl naphthalene and the other high melting dimethyl naphthalenes are separated in the process according to the invention include isomeric dimethyl naphthalenes such as 1,4-, 1,7-, 1,2-, 1,3-dimethyl naphthalene, etc. and other aromatic and nonaromatic hydrocarbons of generally similar boiling point, e.g. in the range from 490 to 515° F. for example, as normally contained in petroleum or coal tar or other hydrocarbon fractions.

The invention will be further described with reference to the attached drawing, which is a schematic flowsheet of one embodiment of the process.

A petroleum fraction, e.g. a 495 to 510° F. boiling range distillate from an aromatic concentrate obtained from catalytic gas oil, is dissolved in n-pentane 10. The solution is cooled 12 and filtered 14. The filter cake is heated 16 to melt a portion thereof, and the melted portion is separated from the unmelted portion by filtration 18. The filter cake is washed with methanol 19, then redissolved in pentane 20. The solution is cooled 22, and purified 2,6-dimethyl naphthalene is filtered 24 from the pentane solution. The crystals are allowed to warm to room temperature (not shown), and if desired any melted material is removed.

From the filtrates that are produced in the various stages of the process, small additional amounts of 2,6-dimethyl naphthalene can be precipitated by recrystallization procedure, and the additional crops of crystals can be subjected to the fractional melting and recrystallization steps to recover additional amounts of purified 2,6-dimethyl naphthalene.

It is essential for optimum results according to the invention that there be two crystallizations, with an intervening fractional melting of the crystals obtained in the earlier crystallizations. Two or more crystallizations without the intervening fractional melting do not produce the highly purified product obtained according to the invention. One crystallization followed by fractional melting produces a substantial purification of the higher-melting isomers, but a second crystallization following the fractional melting is essential for optimum purification.

The following examples illustrate the invention:

EXAMPLE 1

Procedure as shown in the drawing is carried out as follows:

Charge stock: distillate from a furfural extract from catalytic gas oil, boiling range 500 to 505° F.
First crystallization:
    Solvent: 10 ml. of n-pentane per 10 grams of gas oil fraction.
    Solution temperature: room temperature.
    Filtration temperature: −50° C.
    Wash: methanol pre-cooled to 0° C.
First fractional melting:
    Filter cake warmed on filter to 25° C.
    Vacuum then applied to pull melted hydrocarbons through filter.
    Wash: methanol pre-cooled to 0° C.
    Crystals are flushed from the filter with n-pentane.
    Product melting point: 57 to 71° C.
    Product yield: 20 wt. percent based on charge.
Second crystallization:
    Solvent: 10 ml. of n-pentane per 10 grams of product from fractional melting.
    Solution temperature: room temperature.
    Filtration temperature: −50° C.
    Wash: methanol pre-cooled to 0° C.
Second fractional melting:
    Filter cake warmed on filter to 25° C.
    Vacuum then applied to pull any melted hydrocarbons through filter.
    Wash: methanol pre-cooled to 0° C.
    Product melting point: 108 to 110° C.
    Product yield: 10 wt. percent based on charge.

In the preceding operation, the filtrates and washes from the first crystallization and first fractional melting are combined and cooled to −50° C. to obtain another batch of crystals, which is then subjected to the fractional melting and withdrawal of melted material to obtain crystals melting at 77 to 84° C. The filtrates and washes from these operations are again crystallized and fractionally melted to obtain crystals melting at 78 to 89° C. These two additional batches of crystals, totalling about 2% of the original gas oil fraction are added to the charge to the second crystallization referred to above.

This example shows that a very satisfactory extent of concentration of the higher melting isomers, to obtain a melting point quite close to that of the highest melting isomer, can be obtained by the process of the invention.

Comparison example

To show the effect of the first fractional melting, a run is made in which this step is omitted, the conditions being otherwise as stated in Example 1. The washed crystals from the first crystallization are flushed from the filter with pentane, and then subjected to the second crystallization without removal of fractionally melted material. The crystals obtained in the second crystallization have melting point of 65° C., and additional recrystallization under the same conditions fails to raise the melting point.

EXAMPLE 2

Procedure as follows is carried out, the conditions being otherwise the same as in Example 1:

First crystallization:
  Solvent: 20 ml. of n-pentane per 10 grams of gas oil fraction.
  Filtration temperature: −20° C.
Second crystallization:
  Solvent: 20 ml. of equal volume mixture of methanol and n-pentane.
  Filtration temperature: 0° C.
Second fractional melting:
  Product melting point: 109 to 111° C.
  Product yield: 2 weight percent based on charge.

This example shows that higher filtration temperatures than those in Example 1 are operative, but result in lower yields of 2,6-dimethyl naphthalene, and that methanol-pentane mixtures can be satisfactorily employed in the second crystallization.

This application is a continuation-in-part of application Serial No. 857,448, filed December 4, 1959, now abandoned.

The invention claimed is:

1. Process for concentrating higher melting dimethyl naphthalene from aromatic hydrocarbon mixtures containing the same which comprises: dissolving such hydrocarbon mixture in a solvent; said solvent being capable of dissolving at least one gram per 10 ml. solvent at 25° C. of aromatic hydrocarbons boiling in the range of 495° F. to 510° F.; cooling the solution to a temperature in the approximate range from 0° C. to minus 60° C.; separating cyrstals from the cooled solution; heating the crystals to a temperature in the approximate range from 5° C. to 50° C. and below the melting point of the highest melting component of said crystals in order to melt a portion thereof; and separating lower-melting hydrocarbons from the heated crystals.

2. Process for recovering higher melting dimethyl naphthalene from aromatic hydrocarbon mixtures containing the same which comprises: dissolving such hydrocarbon mixture in a solvent; said solvent being capable of dissolving at least one gram per 10 ml. solvent at 25° C. of aromatic hydrocarbons boiling in the range of 495° F. to 510° F.; cooling the solution to a temperature in the approximate range from 0° C. to minus 60° C.; separating crystals from the cooled solution; heating the crystals to a temperature in the approximate range from 5° C. to 50° C. in order to melt a portion thereof; separating lower-melting hydrocarbons from the heated crystals; dissolving the crystals in a solvent; said solvent being capable of dissolving at least one gram per 10 ml. solvent at 25° C. of aromatic hydrocarbon boiling in the range of 495° F. to 510° F.; cooling the solution to a temperature in the approximate range from 0° C. to minus 60° C.; and separating crystals of higher melting dimethyl naphthalene from the cooled solution.

3. Process according to claim 2 wherein at least a portion of said lower-melting hydrocarbons is washed from said heated crystals by means of a solvent; said solvent being capable of dissolving at least one gram per 10 ml. solvent at 25° C. of aromatic hydrocarbons boiling in the range of 495° F. to 510° F.

4. Process according to claim 2 wherein the first-named solvent is n-pentane.

5. Process according to claim 2 wherein the second-named solvent is n-pentane.

6. Process according to claim 2 wherein the second-named solvent is a mixture of n-pentane and methanol.

7. Process according to claim 2 wherein each of said solvents is selected from the group consisting of saturated aliphatic hydrocarbons, mixtures thereof with aliphatic alcohols, and mixtures thereof with aliphatic ketones.

References Cited in the file of this patent
UNITED STATES PATENTS

| | | |
|---|---|---|
| 2,428,102 | Swietoslawski | Sept. 30, 1947 |
| 2,766,309 | Speed et al. | Oct. 9, 1956 |
| 2,777,889 | Naumann | Jan. 15, 1957 |
| 2,858,348 | Bosmajian et al. | Oct. 28, 1958 |
| 2,886,587 | Kolner | May 12, 1959 |

FOREIGN PATENTS

| | | |
|---|---|---|
| 534,832 | Canada | Dec. 25, 1956 |